(12) United States Patent
Saban et al.

(10) Patent No.: US 7,840,190 B2
(45) Date of Patent: Nov. 23, 2010

(54) FREQUENCY SOURCE SYNCHRONIZATION AND REDUNDANCY

(75) Inventors: Ofer Saban, Beit Elazari (IL); Isaac Shapira, Petach Tikva (IL); Rami Reuveni, Rishon Letzion (IL); Yair Shapira, Shoham (IL)

(73) Assignee: Mobile Access Networks Ltd., Lod (IL)

( * ) Notice: Subject to any disclaimer, the term of this patent is extended or adjusted under 35 U.S.C. 154(b) by 557 days.

(21) Appl. No.: 11/828,363

(22) Filed: Jul. 26, 2007

(65) Prior Publication Data

US 2009/0029663 A1 Jan. 29, 2009

(51) Int. Cl.
*H04B 1/40* (2006.01)
*H04K 3/00* (2006.01)

(52) U.S. Cl. .............................. 455/76; 455/260; 331/2; 331/49

(58) Field of Classification Search .................... 455/76, 455/132, 260, 265; 327/141, 144, 147; 331/2, 331/49; 375/354, 376
See application file for complete search history.

(56) References Cited

U.S. PATENT DOCUMENTS

| 5,870,441 A * | 2/1999 | Cotton et al. ............... 375/354 |
| 2005/0104666 A1 | 5/2005 | Rebel |
| 2005/0123085 A1* | 6/2005 | Skog et al. .................. 375/354 |

* cited by examiner

*Primary Examiner*—Lee Nguyen
(74) *Attorney, Agent, or Firm*—Mark M. Friedman

(57) ABSTRACT

A system and method for ensuring proper synchronization of a plurality of frequency sources used in reception diversity-based radio reception. The frequency sources are concatenated in a synchronization loop, through which one frequency source having a high performance oscillator is configured as a master source. Through its oscillator, the master provides an internal synchronization signal that synchronizes all other sources, which have lower performance oscillators and are configured as slaves. Upon a failure in the master oscillator or in the synchronization loop, a slave source takes over as an alternative master source and provides its internal oscillator signal as an alternative synchronization signal to all other frequency sources.

18 Claims, 5 Drawing Sheets

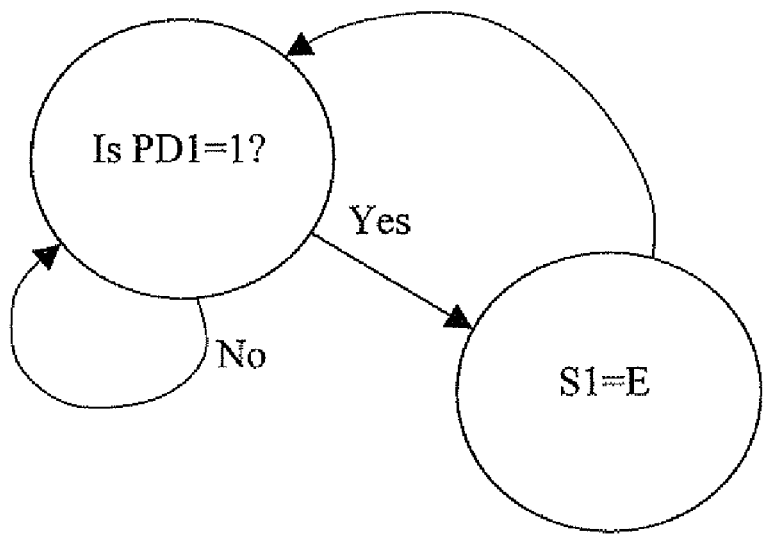
FIG. 4A: Master unit state diagram
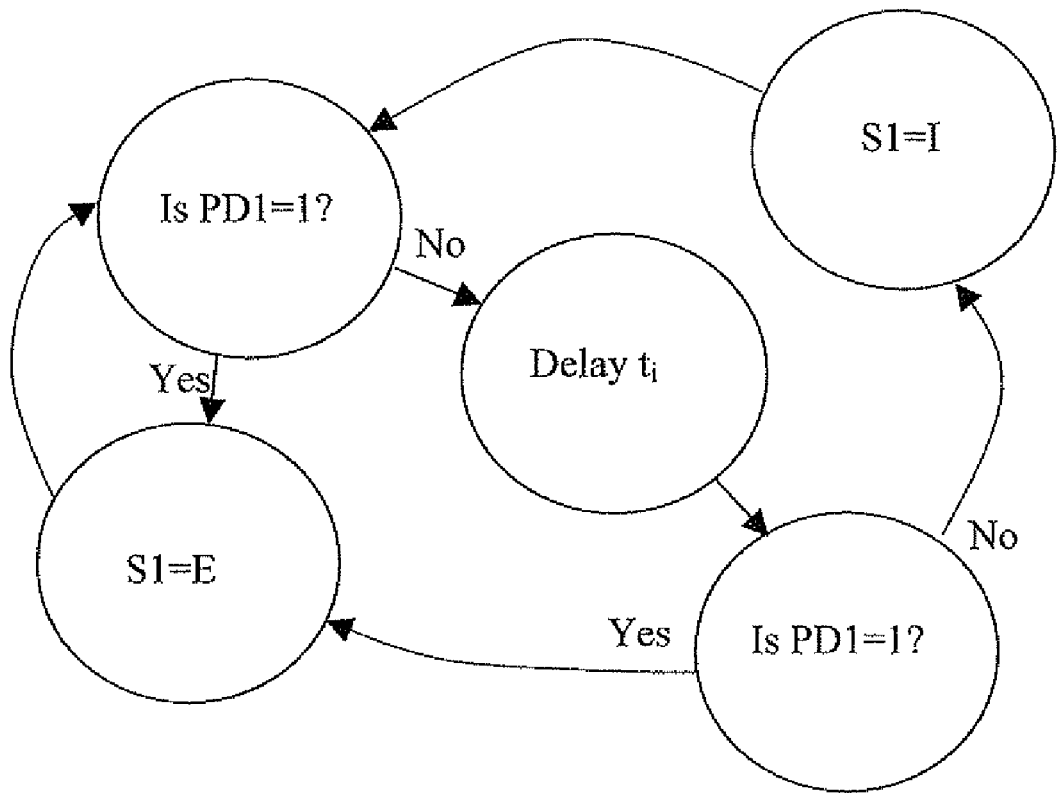
FIG. 4b: Slave unit state diagram

| | S1 Position | | |
|---|---|---|---|
| | Initial | Phase 1 | Phase 2 |
| | E | E | → I |
| | I → | E | E |
| | E | E | E |
| | E → | I → | E |

FREQUENCY SOURCE SYNCHRONIZATION AND REDUNDANCY

FIELD OF THE INVENTION

The present invention refers in general to radio transmission systems and in particular to radio transmission systems using reception diversity.

BACKGROUND OF THE INVENTION

One of the methods for ensuring a reliable reception of a radio signal is by use of reception diversity. According to this method, shown in FIG. 1, the signal is received simultaneously by a multiplicity of antennas A, B, C, D. Each antenna is fed to a respective separate receiver 102A, B, C, D. Frequency sources 104A, B, C, D are used in the receivers for down conversion of the received signal. The down converted signals of all receivers are fed to a selection subsystem 106 which selects the best signal at any given moment. To ensure a proper operation of such system it is extremely important to ensure minimum deviation between frequency sources 104. Nevertheless it is also important to keep good absolute accuracy of all frequency sources. If these terms are not kept, the frequency errors might degrade the quality of the demodulated signal even though the communication link was adequate. In order to keep good accuracy and frequency correlation between the frequency sources of all receivers, in the state of the art an accurate frequency source is used in each receiver. Such accurate frequency sources are high quality, expensive oscillators with low aging rate and special means for stabilizing the output frequency versus temperature variation. With increasing required accuracy and stabilization requirements, the cost of the frequency sources increases as well.

The need for synchronizing several receivers on the same frequency is not new. Several methods are known in this field. The simplest method is based on the use of an external (to the system) frequency source, split the signal into branches and feed each receiver with a branch of the split signal. This method has several known drawbacks: the first drawback is due to the fact that the operation relies on a single frequency source. If this frequency source ceases to function, all receivers cease to function. In addition, there is no backup for the scenario where the relatively sensitive phase lock loop in each receiver ceases to function. If any phase locked loop ceases to function, there is no identification for this situation and the corresponding receiver also ceases to function. In addition, the solution described above does not deal with the common problem of disconnected cables. If any of the cables connecting the frequency reference to the receiver is disconnected, the corresponding receiver also ceases to function.

U.S. Patent Application 2005/0104666 discloses a typical example of a prior art mechanism for synchronizing frequency sources of multiple receivers. According to US 2005/0104666, a single frequency source synchronizes two or more phase locked loops, each generating a frequency used by a different receiver. One phase locked loop ("master") synchronizes the other phase locked loops at any given moment. The system described in US 2005/0104666 has the ability to overcome sharp deviations of the master phase locked loop from the nominal frequency. When such a deviation is identified, another phase locked loop takes control and synchronizes the other phase locked loops. However, this system has several drawbacks that the present invention solves. The operation of the system described in US 2005/0104666 is based on a single reference frequency. If this reference frequency ceases to function, all phase locked loops loose their frequency reference and deviate from their central frequency with no means to rectify this situation. In other words, this system has no redundancy in case the reference frequency source ceases to function. In addition, if any of the cables connecting any of the phase locked loops to the frequency reference or connecting the slaves phase locked loops to the master phase locked loops are disconnected the corresponded phase locked loop cease to operate.

Accordingly, there is a need for, and it would be advantageous to have a mechanism to ensure proper synchronization of frequency sources without use of very expensive frequency sources and to create a spontaneous detection and recovery mechanism from several potential failures.

SUMMARY OF THE INVENTION

The present invention describes a system and method for synchronizing the frequency sources of a multiplicity of receivers used for reception diversity. It discloses several mechanisms that make the frequency generation system more robust and able to rectify common malfunctions that prior art (e.g. US 2005/0104666) solutions cannot rectify. The disclosed system and method enable the following;

1) Feeding of all receivers by a single frequency source (called" master"), ensuring no frequency error between the receivers. The other frequency sources are defined as "slaves".
2) In case of a failure of the "master", another frequency source (one of the "slaves") takes its place and synchronizes the frequency sources of the receivers.
3) In case of a disconnection of any of the cables carrying the synchronization signal to the frequency source units, the first frequency source after the disconnected cable becomes a "master". All other frequency source units use its signal and transfer it to their respective outputs.
4) A high quality oscillator needs to be used only for the "master" reference source. The slave units can use a lower cost oscillator with lower initial accuracy and higher drift. If the "master" oscillator fails, a high level of accuracy is kept for some time even if a lower cost oscillator takes its place. This feature is refereed to in this application as "Frequency Memory".

According to the present invention there is provided, in a radio reception system using reception diversity, a method for ensuring proper synchronization of a plurality of frequency sources comprising the steps of: concatenating the frequency sources to create a synchronization loop; configuring one of the frequency sources as master and configuring the rest of the frequency sources as slaves; by the master frequency source, providing a master synchronization signal that synchronizes all slave frequency sources through the synchronization loop; and, upon detection of a failure in the synchronization loop, enabling a slave frequency source to provide an alternative master synchronization signal.

It should be understood that as used herein, a "failure in the synchronization loop" is meant to cover any failure, by any reason, to provide a single synchronization signal to all frequency sources. This specifically includes failure of the master oscillator to output its signal to all the slaves as well as a physical failure in the connections between the frequency sources.

According to the present invention there is provided, in a radio reception system using reception diversity, a method for ensuring proper synchronization of a plurality of frequency sources, comprising the steps of: configuring one of the frequency sources as master and configuring the rest of the frequency sources as slaves, wherein the master frequency source is used to provide a master synchronization signal to the slave frequency sources through a synchronization loop; detecting a failure in the synchronization of the frequency sources; and replacing the master frequency source with a replacement slave frequency source that provides an alternative synchronization signal to all other frequency sources of the plurality.

According to the present invention there is provided a system for ensuring proper synchronization of a plurality of frequency sources used in reception diversity-based radio reception, the system comprising a synchronization loop connecting functionally all frequency sources, a main synchronization mechanism used to provide a main synchronization signal to all the frequency sources and an alternative synchronization mechanism used to provide an alternative synchronization signal substantially equal to the main synchronization signal in case of failure of the main synchronization mechanism.

In some embodiments, the main synchronization mechanism includes a frequency source configured as a master and wherein the alternative synchronization mechanism includes each of the other frequency sources configured as slaves.

In some embodiments, the master and slave frequency sources include respective master and slave oscillators for providing the respective synchronization signal Preferably, each slave oscillator is a lower performance oscillator than the master oscillator.

Preferably, the performance is measured in terms of a parameter selected from the group consisting of drift and stability.

BRIEF DESCRIPTION OF THE DRAWINGS

The invention is herein described, by way of example only, with reference to the accompanying drawings, wherein:

FIG. 4A shows a master unit state diagram

FIG. 4B shows a slave unit state diagram;

DETAILED DESCRIPTION OF THE INVENTION

Figure 1:
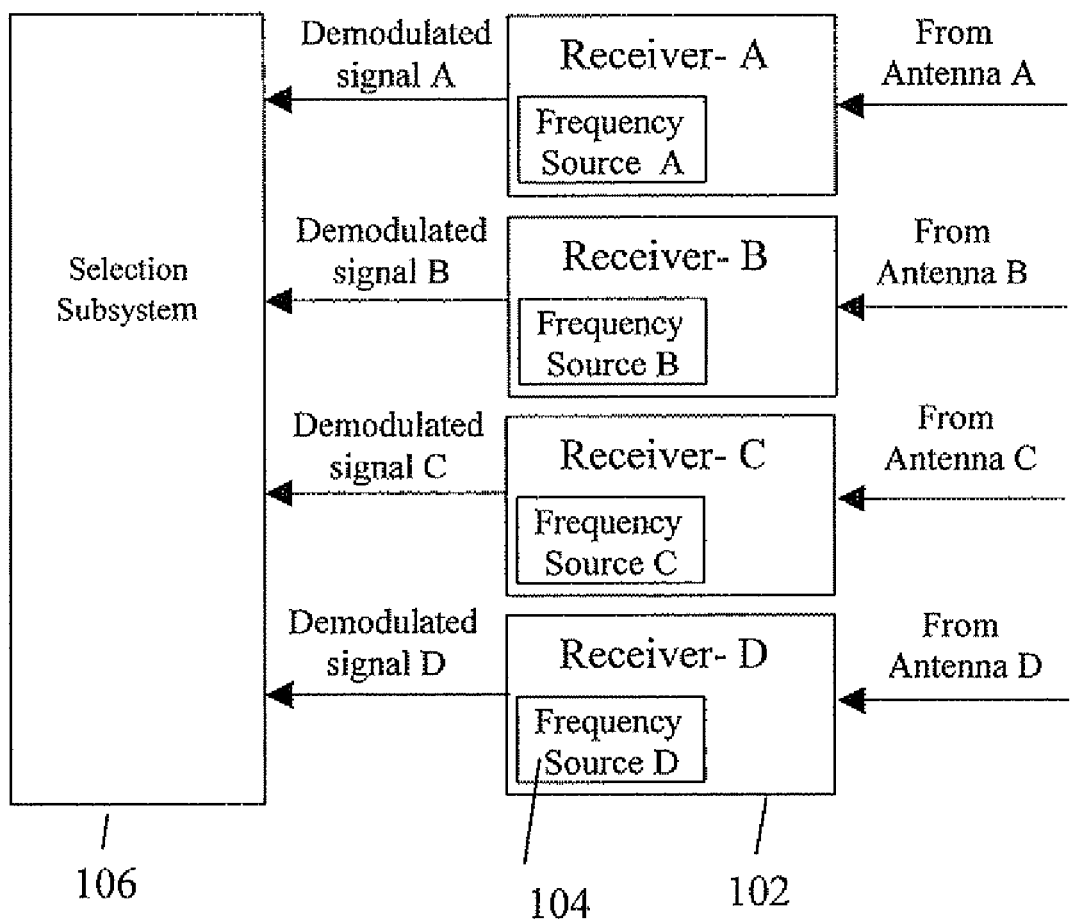
FIG. 1 shows a generic receiver diversity architecture where the signal is received simultaneously by a multiplicity of antennas.
Figure 2:
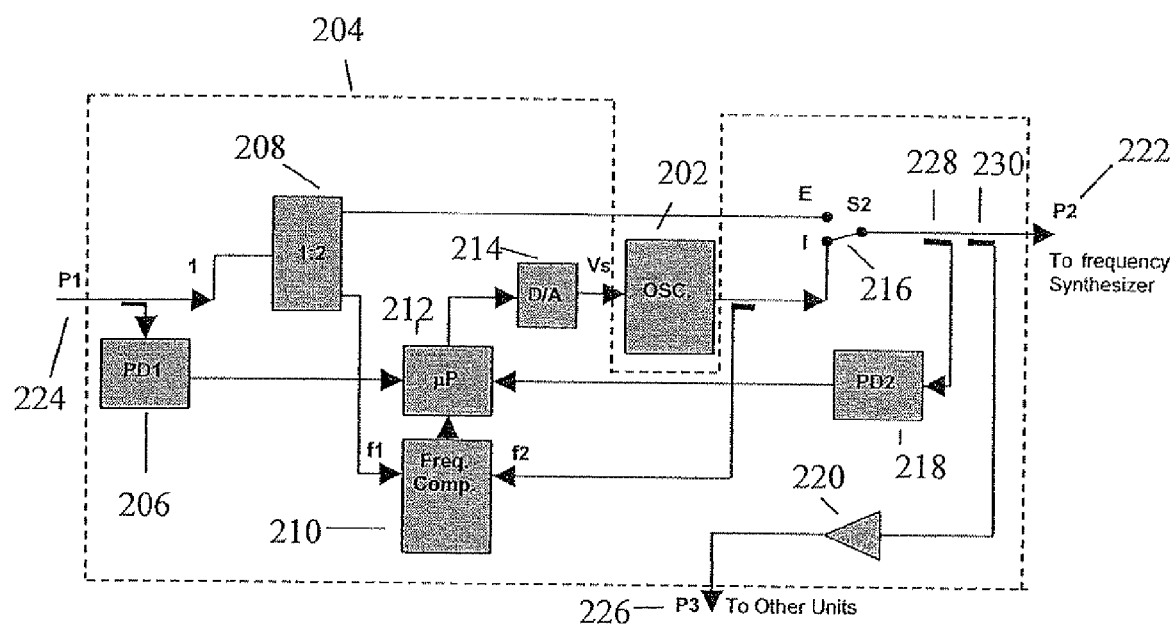
FIG. 2 shows the structure of a frequency source according to one embodiment of the present invention.

FIG. 2 shows the structure of a frequency source 200 according to one embodiment of the present invention. A number of such frequency sources are arranged in a system 300 shown in FIG. 3. The frequency source includes an internal oscillator 202 and an electronic circuit 204 that performs two main functions: a) in a "slave" unit, it drives the internal oscillator to oscillate at the same frequency as an external ("master") oscillator and b) it detects a failure in the frequency source units or a disconnection of any of the cables concatenating them and switches a failed frequency source 200 accordingly from using its internal oscillator to using a signal arriving from an external oscillator ("external" meaning another unit in system 300, typically the "master" unit). When a "slave" oscillator starts to use its internal oscillator, a steering voltage $V_s$ at the output of a digit to analog (D/A) converter 214 (see below) "freezes", hence driving the "slave" oscillator to keep oscillate at the same frequency generated by it while it was synchronized with the "master" oscillator.

A circuit 204 includes a first power detector (PD1) 206, a frequency comparator 210, a power splitter 208, a microprocessor 212, D/A converter 214, a switch 216 with two positions I ("Internal") and E ("External"), a second power detector (PD2) 218 and an amplifier 220, interconnected as shown in FIG. 2. Switch 216 selects whether an output 222 (P2) of frequency source 200 will provide the frequency of internal oscillator 202 or the frequency of an external frequency source. When switch 216 is in position I, the frequency of the internal oscillator 202 is used. When switch 216 is in position E, the frequency of the external source, fed to an input port 224 (P1) is used. First power detector 206 provides an indication whether a signal arrives at input port 224 from the external frequency source or not. Second power detector 218 provides an indication whether a signal exists at frequency source output 222. The following convention is used hereinafter: when any of the power detectors detects the existence of a signal, it reports "PD=1" and when any of the power detectors detects that no signal exists, it reports "PD=0".

Master-Slaves Mode of Operation

Figure 3:
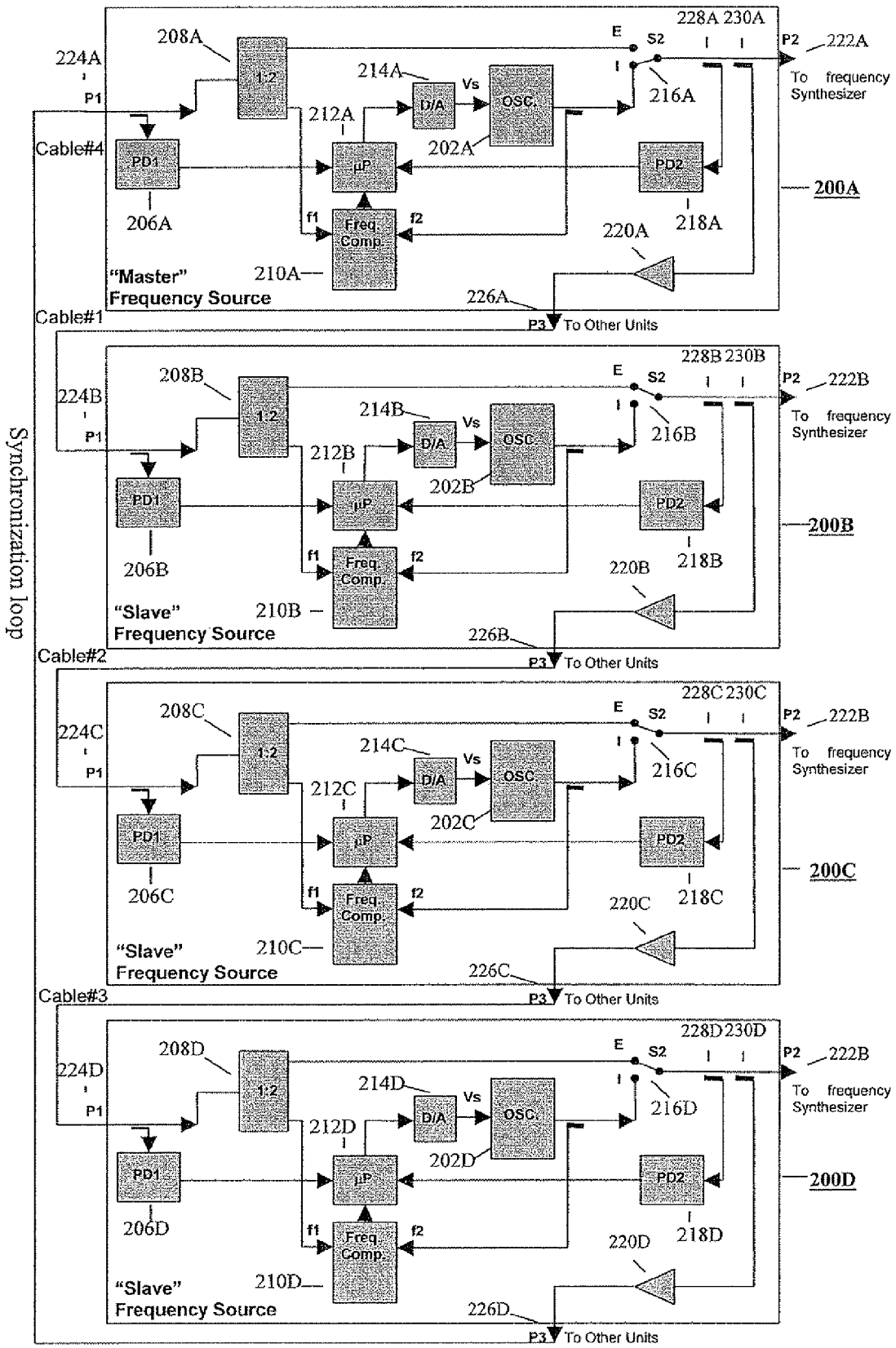
FIG. 3 shows the connection between the frequency sources of different receivers according to the presented invention.

FIG. 3 shows a system 300 that includes four receivers with four frequency sources ("units") 200A, 200B, 200C and 200D, interconnected such that a "synchronization loop" is created by concatenating an output 226 of each unit to an input 224 of a next unit. The frequency sources are connected as shown by cables marked as Cable#1, Cable#2, Cable#2 and Cable#4. Specifically, each frequency source is connected with an output port (P3) to an input port (P1) of a next-in-line frequency source. The various elements of each frequency source follow the numbering convention of FIG. 2, with the addition of the letter A, B, C and D that match the respective source letter. System 300 is configured in a "Master-Slave" mode. Note that the choice of four units is arbitrary and that less than four (down to two) or more than four units can be concatenated. When configured in this mode, one of the frequency sources (in this case 200A) is configured as a "master", while the other three (in this case 200B, 200C and 200D) are configured as "slaves". FIG. 4 shows a state diagram for the "master" and the "slave" type units. Switch 216A of master frequency source 200A is set to position I and routes the signal of its internal oscillator 202A to output 222A and through its second output port 226A to input port 224B of second frequency source 200B. In the slave units, switch 216 is set to position E. While in position E, the switch of each slave unit routes the signal arriving from the synchronization loop through it respective input port 224 to its respective output 222 (the signal output being P2) and, through its respective second output port 226, to an input port 224 of the "next" frequency source 200. Since all frequency sources use the frequency of the same oscillator (in this case 216A), it is assured that no frequency error exists between the down conversion stages of the receivers. Power detectors 206 and 218 generate an alarm when no signal is detected and provide inputs to the decision algorithm at each frequency source 200 to perform the functionality described next.

Recovering from a Failure in the "Master-Slave" Arrangement

Two types of failures may occur: a) a failure of the oscillator in the master unit to generate a signal b) a disconnection of any of the cables connecting between the frequency sources. When the master frequency source discovers that its oscillator is not functioning (no signal at PD2 218, i.e. PD2=0), it changes the position of switch 216 to E ("External mode") and another frequency source takes the role of the "master" in providing a synchronization signal to the other frequency sources. When any of the cables between the frequency sources is disconnected, an iterative recovery process starts, which stabilizes when the first frequency source after the disconnected cable takes the role of the "master" in providing the signal (referred to hereinafter as an "alternative master synchronization signal) to the other frequency sources. For example (refer to FIG. 3), assume that frequency source 200B is the "master" and that cable #4 is disconnected. By the end of the iterative recovery process, frequency source 200A will provide the signal to the rest of the frequency sources. That is, frequency source 200A will use its internal oscillator as the synchronizing signal. The other frequency sources then use the signal originated by frequency source 200A as their synchronizing signal. The iterative process may be better understood using the example illustrated in FIG. 5.

Figure 5:
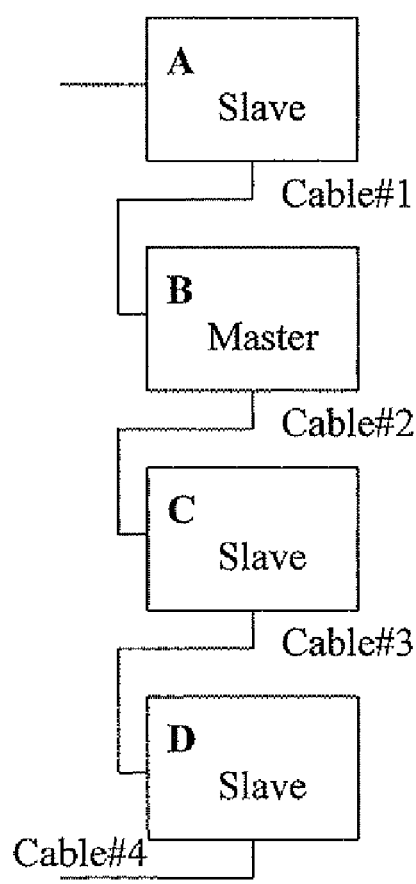
FIG. 5 shows an example for recovery after cable disconnection applied in the system of FIG. 3.

In the initial state, shown in FIG. 5, frequency source B is configured as "master" and provides its signal to the synchronization loop. This represents a main synchronization mechanism and the signal provided by the master is considered a main synchronization signal. The master internal switch S1 is set to the I position. The other units are configured as "slaves" and use the signal of the master frequency source. Switch S1 of the slave units is initially set to E External position. Now assume for example, that cable #4 is disconnected. The master unit (frequency source B) senses with power detector PD1 (206B) that no signal enters the unit (PD1=0). In response, according to its state table, shown in FIG. 4A, the master unit changes the position of switch S1 to E. The slave units now sense that there is no synchronization signal. According to the "slave" states diagram in FIG. 4B, each slave unit enters an arbitrary delay period $t_i$ determined randomly by the microprocessor. By the end of the delay period of each slave unit, the slave unit checks again whether the synchronization signal appears or not. If by the end of the delay period the synchronization signal still does not exist, the slave unit changes the position of S1 to I.

Now assume that the slave unit with the shortest delay period is frequency source D. In this case, S1 of frequency source D will switch to I and the unit will inject the signal of its internal oscillator to the synchronization loop. However, since cable#4 is disconnected the all other units will not get the synchronization signal. The other slave units are already in their delay period, "waiting" for its expiration. Now assume that the next delay period to expire is of frequency source unit A. Following the state diagram shown in FIG. 4B, frequency source A changes the position of switch S1 to I and injects the signal of its internal oscillator to the synchronization loop. Since a continuity of signal path exist between the output of frequency source A and the input of all other frequency source units, they will all get a synchronization signal at their P1 (224) port, beside of frequency source A itself (due to the disconnection of cable #4). According to the state diagram shown in FIG. 4A, the master unit (frequency source B) will remain in position S1=E (external). The slave units which get a synchronization signal will eventually "park" on S1=E (external). A mechanism by which one of the slave units replaces the master unit in its function as a provider of a synchronization signal to all other units is referred to also as an "alternative synchronization mechanism" and the signal provided by the this slave unit is referred to as an "alternative synchronization signal".

To reduce the overall system cost, it possible to use a high accuracy oscillator only for the unit originally defined as "master". The oscillators used in frequency sources initially defined as "slaves" do not have to be as accurate and stable as the master oscillator. According to the invention, the slave oscillators are synchronized by the master oscillator and have a "frequency memory" which keeps a slave oscillator accurate enough for a time required to replace a faulty master oscillator.

"Frequency memory" is achieved by the following mechanism; in each slave, frequency comparator 210 compares the frequency of the internal oscillator (f2) with the frequency of the external frequency source (f1). The difference between the frequencies, provided by the frequency comparator 210, is translated by microprocessor 212 and D/A 214 into steering voltage Vs. Steering voltage Vs steers oscillator 202 to produce a frequency exactly equal to the frequency of the external frequency f1. When a slave frequency source becomes a temporary master, its D/A 214 "freezes" the steering voltage Vs and the frequency of the oscillator is kept with no significant change for a period of time sufficient enough to replace the faulty master oscillator.

The following are commonly used values, given as an example. The master oscillator is a low drift, high stability oscillator with a drift rate of 0.05 ppm/year. The slave oscillator can be a lower cost oscillator with a drift rate of 0.5 ppm/year. The slaves can be designed to have a 0.1 ppm bit steering ratio. Using a range of +/−100 bits, the slave oscillator can be pulled in the range of +/−10 ppm and a +/−0.5 bit error of the D/A will result in a +/−0.05 ppm error. If an overall accuracy of 0.1 ppm is required and 0.05 ppm was wasted by the D/A error, a +/−0.05 ppm drift may still be allowed. The slave oscillator which drifts at a rate of 0.5 ppm a year, drifts 0.05 ppm in 36.5 days, which is sufficient enough time for replacing the faulty master oscillator.

All publications and patents mentioned in this specification are incorporated herein in their entirety by reference into the specification, to the same extent as if each individual publication or patent was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. In a radio reception system, a method for ensuring proper frequency synchronization of a plurality of frequency sources, each having an internal oscillator, the method comprising the steps of:
   a. concatenating the frequency sources to create a synchronization loop wherein each frequency source synchronizes the internal oscillator of a next in line frequency source;
   b. configuring one of the frequency sources as master frequency source and configuring the rest of the frequency sources as slaves;
   c. an internal oscillator of said master frequency source, providing a master synchronization signal that synchronizes the internal oscillator of the next in line frequency source, thereby synchronizing the oscillators in said slave frequency sources through the synchronization loop; and
   d. upon detection of a failure in the synchronization loop, enabling a slave frequency source to provide an alternative master synchronization signal having the same frequency as the replaced master frequency source within acceptable limits for acceptable period of time.

2. The method of claim 1, wherein each oscillator in each frequency source is associated with means for adjusting its frequency to the frequency of a master synchronization signal.

3. The method of claim 1, wherein the step of concatenating includes connecting an output port of one frequency source to an input port of a next-in-line frequency source, whereby the synchronization signal passes through this connection.

4. The method of claim 1, wherein each frequency source includes a switch with two states, and wherein the step of enabling includes switching the switch from a first state to a second state, whereby in the first state the switch passes the master synchronization signal and in the second state the switch passes the alternative master synchronization signal.

5. The method of claim 1, wherein the step of enabling a slave frequency source to provide an alternative master synchronization signal includes providing to each oscillator at each frequency source a frequency memory capability that ensures that after said enabling a slave frequency source to provide an alternative master synchronization signal, the frequency of the provided signal remains accurate within acceptable limits for acceptable period of time.

6. The method of claim 1, wherein the detection of a failure in the synchronization loop includes detection of a failure of the master oscillator to provide the master synchronization signal.

7. The method of claim 1, wherein the detection of a failure in the synchronization loop includes detection of a failure in the connection between two adjacent frequency units.

8. In a radio reception system method for ensuring proper frequency synchronization of a plurality of frequency sources each having an internal oscillator, the method comprising the steps of:
  a. configuring one of the frequency sources as master and configuring the rest of the frequency sources as slaves, wherein the master frequency source is used to provide a master synchronization signal to the slave frequency sources through a synchronization loop;
  b. detecting a failure in the synchronization of the frequency sources; and
  c. replacing the master frequency source with a replacement slave frequency source that provides an alternative synchronization signal, to all other internal oscillators of the frequency sources of the plurality, the internal oscillator of said replacing frequency source having the same frequency as had provided by the internal oscillator of the replaced master frequency source within acceptable limits for acceptable period of time.

9. The method of claim 8, wherein the frequency sources are concatenated in a synchronization loop, and wherein the step of detecting a failure includes detecting a failure selected from a failure of an internal oscillator in each frequency source to provide a synchronization signal and a disconnection in the synchronization loop.

10. The method of claim 9, wherein the failure detection is performed by an electronic circuit included in each frequency source and coupled to the respective internal oscillator.

11. The method of claim 8, wherein the step of replacing includes providing the replacement frequency source with a frequency memory that allows it to keep a required accuracy of the alternative synchronization signal.

12. A system for ensuring proper frequency synchronization of a plurality of frequency sources each frequency source having an internal oscillator, the system comprising:
  a. a synchronization loop connecting functionally all frequency sources;
  b. a main synchronization mechanism used to provide a main synchronization signal to all the frequency sources such that all internal oscillators oscillate in the same frequency; and
  c. an alternative synchronization mechanism used to provide an alternative synchronization signal substantially equal in frequency within acceptable limits for acceptable period of time to the main synchronization signal in case of failure of the main synchronization mechanism.

13. The system of claim 12, wherein the main synchronization mechanism includes a frequency source configured as a master and wherein the alternative synchronization mechanism includes each of the other frequency sources configured as slaves.

14. The system of claim 13, wherein the master and slave frequency sources include respective master and slave oscillators for providing the respective synchronization signal.

15. The system of claim 14, wherein each slave oscillator is a lower performance oscillator than the master oscillator.

16. The system of claim 15, wherein the performance is measured in terms of a parameter selected from the group consisting of drift and stability.

17. The system of claim 14, wherein the master and slave frequency sources further include each an electrical circuit operative to provide a frequency memory that ensures that the frequency of the alternative frequency source is the same frequency within acceptable limits for acceptable period of time as the frequency of the replaced frequency source.

18. The system of claim 14, wherein each internal oscillator of a frequency source is associated with a frequency adjustment mechanism, thereby by concatenating all frequency sources, each frequency oscillator synchronizes a next in line frequency oscillator while the internal oscillator of the master frequency source is the first in line.

* * * * *

UNITED STATES PATENT AND TRADEMARK OFFICE
CERTIFICATE OF CORRECTION

PATENT NO.        : 7,840,190 B2                                              Page 1 of 1
APPLICATION NO.   : 11/828363
DATED             : November 23, 2010
INVENTOR(S)       : Ofer Saban et al.

It is certified that error appears in the above-identified patent and that said Letters Patent is hereby corrected as shown below:

Claim 8, column 7 should be corrected as follows:

Line 31: insert the word --a-- before the word "method"

Signed and Sealed this
Twenty-second Day of March, 2011

David J. Kappos
*Director of the United States Patent and Trademark Office*